(12) United States Patent
Pelan

(10) Patent No.: US 8,915,488 B1
(45) Date of Patent: Dec. 23, 2014

(54) SEPTIC AERATOR

(71) Applicant: Frank J. Pelan, Brighton, IL (US)

(72) Inventor: Frank J. Pelan, Brighton, IL (US)

( * ) Notice: Subject to any disclaimer, the term of this patent is extended or adjusted under 35 U.S.C. 154(b) by 0 days.

(21) Appl. No.: 14/268,341

(22) Filed: May 2, 2014

(51) Int. Cl.
*B01F 3/04* (2006.01)
*C02F 11/06* (2006.01)

(52) U.S. Cl.
CPC ................................. *C02F 11/06* (2013.01)
USPC .............................................. 261/77; 210/220

(58) Field of Classification Search
USPC ........................... 261/76, 77; 210/220, 221.1
See application file for complete search history.

(56) References Cited

U.S. PATENT DOCUMENTS

| | | | |
|---|---|---|---|
| 2,669,440 A | * | 2/1954 | Lindenbergh .................. 261/124 |
| 6,162,020 A | * | 12/2000 | Kondo ............................. 417/54 |
| 6,605,219 B2 | | 8/2003 | Lambert |
| 6,884,353 B2 | | 4/2005 | Hoage et al. |
| 6,942,800 B2 | | 9/2005 | Jungbauer |

* cited by examiner

*Primary Examiner* — Robert A Hopkins
(74) *Attorney, Agent, or Firm* — Crossley Patent Law

(57) ABSTRACT

A septic aerator with a top end and a bottom end, a first pipe spaced apart from a parallel second pipe, a Tee atop each pipe, a first T-junction joining the two Tee's atop the pipes, an elbow atop each of the Tee's atop the pipes, a collar affixed on each pipe proximal to the bottom end, an air space disposed between the collars and the pipes, a plurality of injection holes disposed within the pipes and, in communication with the air spaces, a Tee's disposed below each of the collars, a second Tee junction connecting the Tee's affixed below the collars, a plurality of inlet holes disposed in each Tee below each collar, an air line disposed between the pipes and extended above the top end, an air Tee connected to the air line, the air Tee in communication with the first collar and the second collar airspaces.

2 Claims, 4 Drawing Sheets

SEPTIC AERATOR

BACKGROUND OF THE INVENTION

Various types of septic system products and devices are known in the prior art. However, what is needed is a basic, universal, inexpensive septic aerator that is easily installed and energy efficient, typically requiring lesser air flow from smaller air pumps than do most aerators.

FIELD OF THE INVENTION

The present invention relates to septic system devices and more particularly, to a septic aerator that is inexpensive, easily installed, universally applied, and more energy efficient than other devices.

SUMMARY OF THE INVENTION

The general purpose of the present septic aerator, described subsequently in greater detail, is to provide a septic aerator that has many novel features that result in a septic aerator which is not anticipated, rendered obvious, suggested, or even implied by prior art, either alone or in combination thereof.

To accomplish this, the present septic aerator comprises a top end spaced apart from a bottom end. The aerator further comprises a first pipe spaced apart from a parallel second pipe. A plurality of Tee's is provided. One Tee is affixed atop the first pipe and one Tee is affixed atop the second pipe. A first T-junction joins the two Tee's atop the first pipe and the second pipe, respectively. A pair of identical elbows is provided. One elbow is affixed atop the Tee atop the first pipe and one elbow is affixed atop the Tee atop the second pipe. The elbows face in 180 degree offset positions.

A first collar is affixed on the first pipe proximal to the bottom end. A second collar is affixed on the second pipe proximal to the bottom end. An air space is disposed between each collar and each pipe, respectively. A plurality of injection holes is disposed within the first pipe and the second pipe. The injection holes are in communication with the air spaces, respectively. One Tee is disposed below the first collar, and one Tee is disposed below the second collar. An air line is disposed between the first pipe and the second pipe and extended above the top end. The air line is configured for attachment to an existing air pump. An air Tee is connected to the air line. The air Tee is disposed between and connected to the air spaces in the first collar and the second collar.

Thus has been broadly outlined the more important features of the present septic aerator so that the detailed description thereof that follows may be better understood and in order that the present contribution to the art may be better appreciated.

BRIEF DESCRIPTION OF THE DRAWINGS FIGURES

Figure 1:
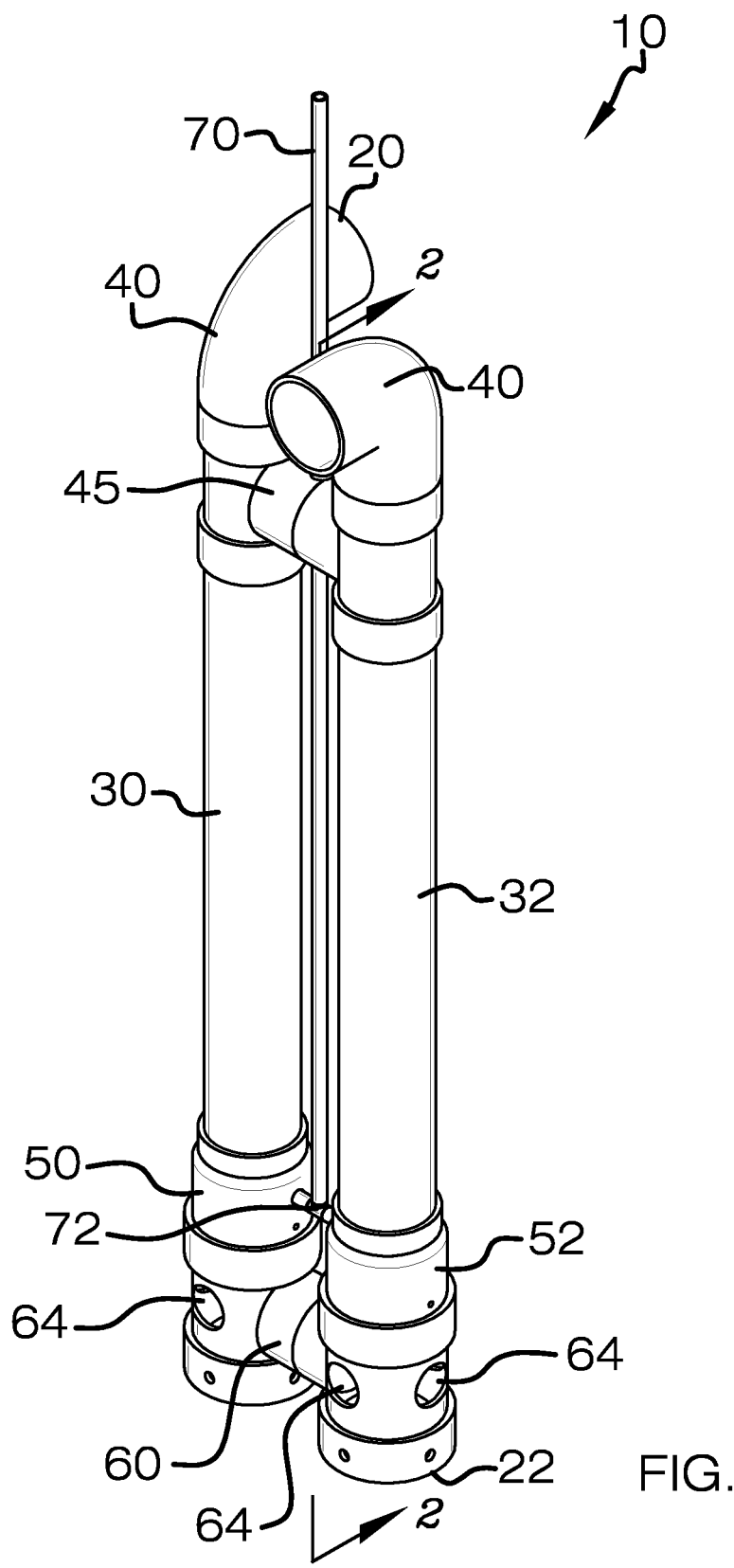
Figure 2:
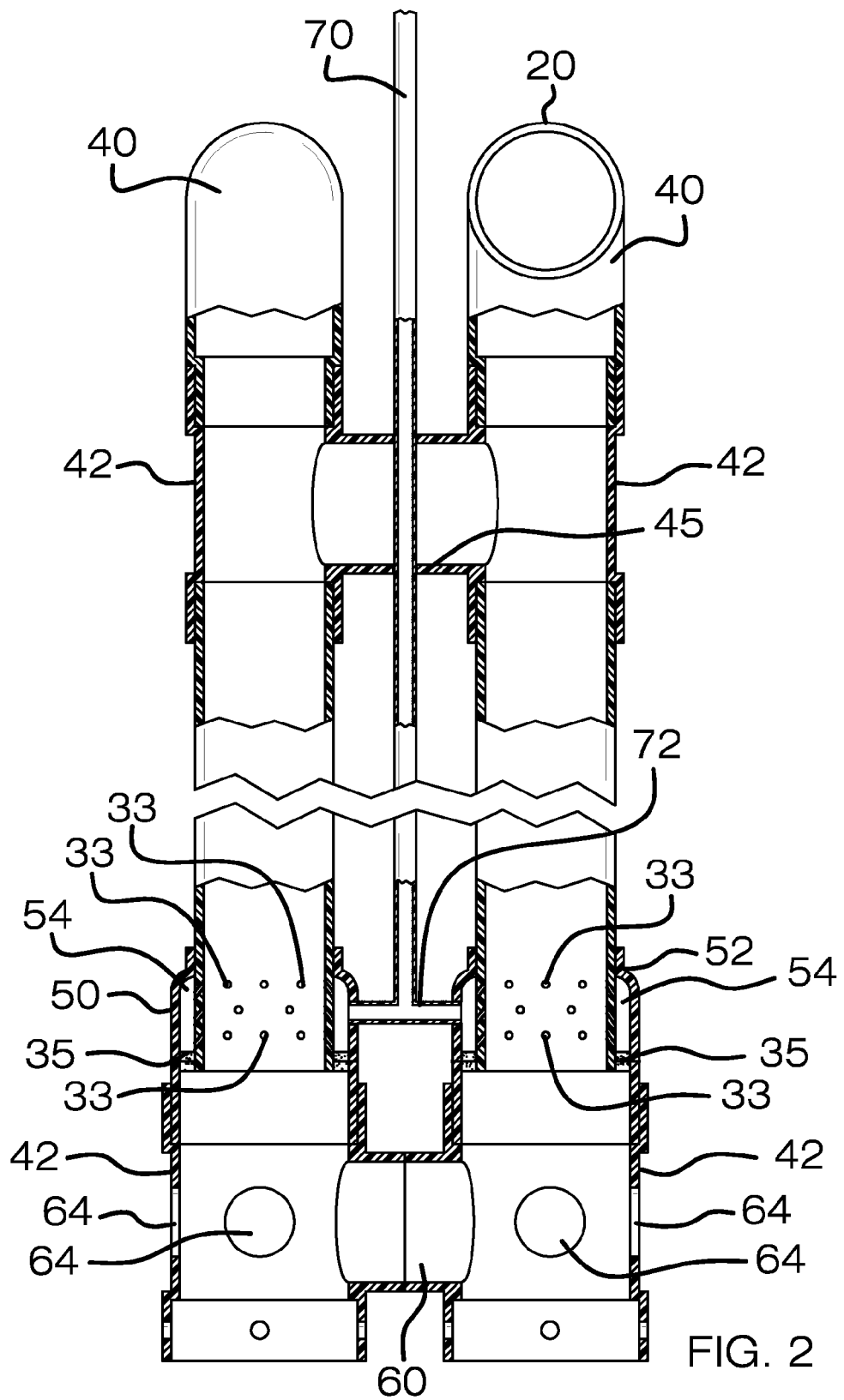
Figure 3:
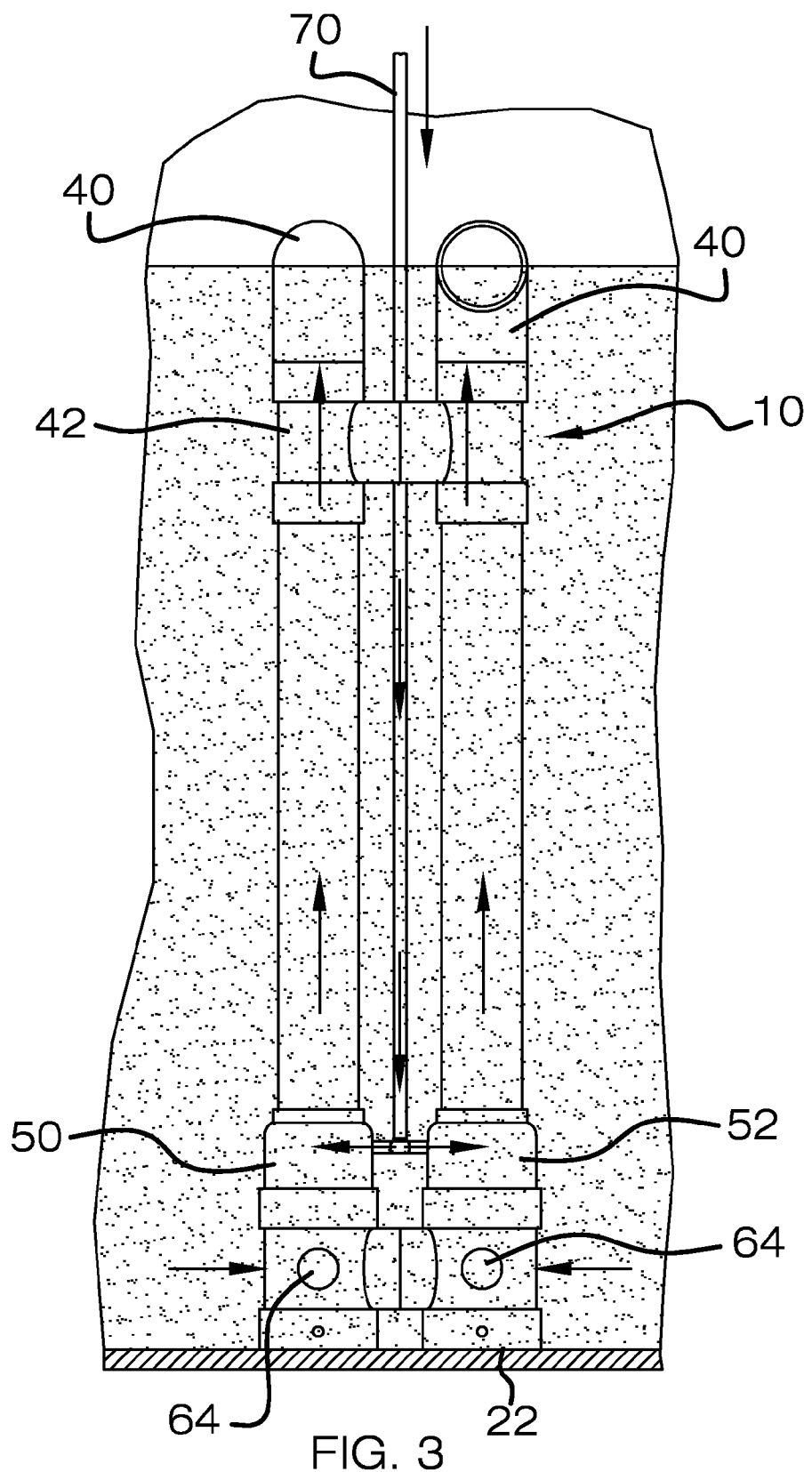
Figure 4:
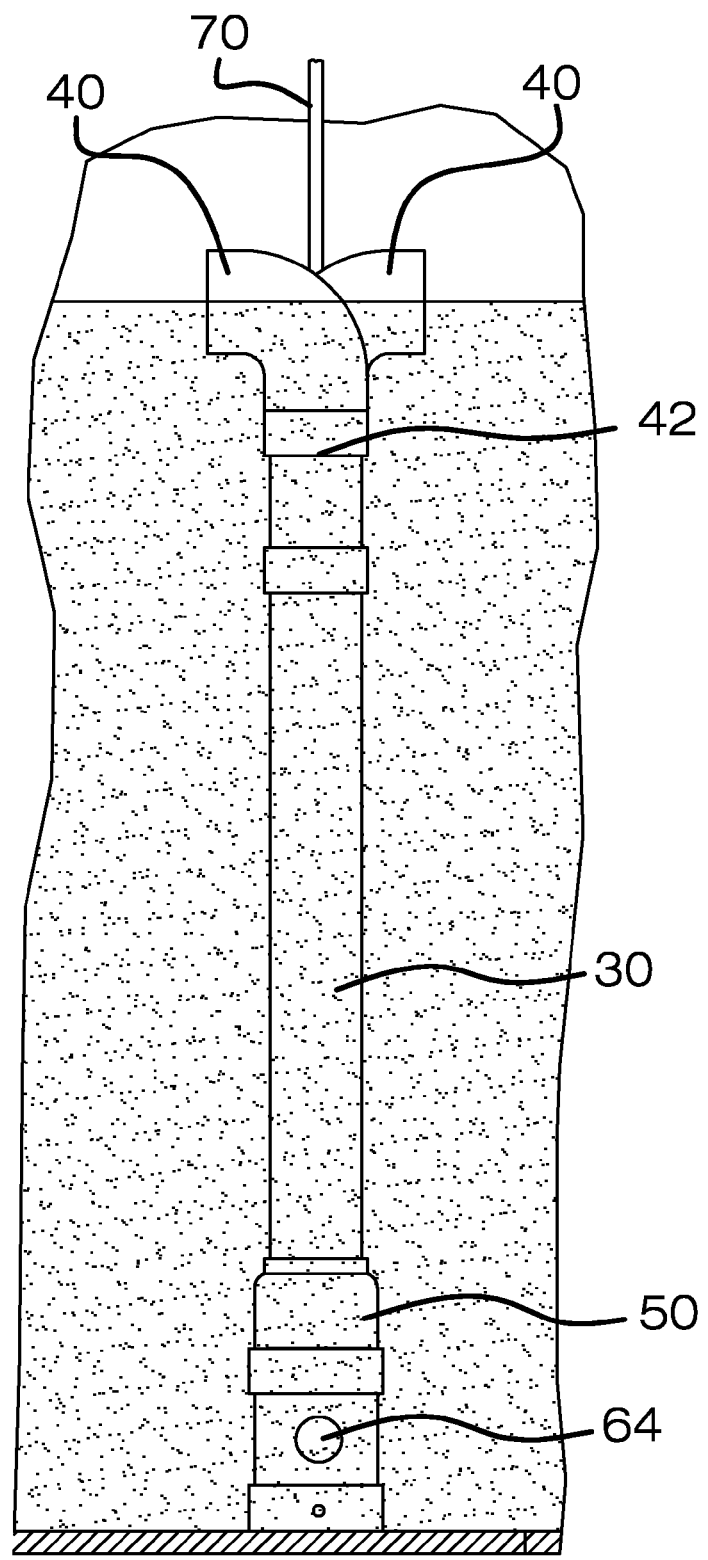

FIG. 1 is a perspective view.
FIG. 2 is a cross sectional view.
FIG. 3 is a front in use view.
FIG. 4 is a side in use view.

DETAILED DESCRIPTION OF THE DRAWINGS

With reference now to the drawings, and in particular FIGS. 1 through 4 thereof, an example of the septic aerator employing the principles and concepts of the present septic aerator and generally designated by the reference number 10 will be described.

Referring to FIGS. 1 through 4, the septic aerator 10 is illustrated. The septic aerator 10 comprises a top end 20 spaced apart from a bottom end 22. The aerator 10 further comprises a first pipe 30 spaced apart from a parallel second pipe 32. The first pipe 30 and the second pipe 32 are identical. A plurality of identical Tee's 42 is provided. One Tee 42 is affixed atop the first pipe 30 and one Tee 42 is affixed atop the second pipe 32. A first T-junction 45 joins the two Tee's 42 atop the first pipe 30 and the second pipe 32, respectively. A pair of identical elbows 40 is provided. One elbow 40 is affixed atop the Tee 42 atop the first pipe 30 and one elbow 40 is affixed atop the Tee 42 atop the second pipe 32. The elbows face in 180 degree offset.

A first collar 50 is affixed on the first pipe 30 proximal to the bottom end 22. A second collar 52 is affixed on the second pipe 32 proximal to the bottom end 22. An air space 54 is disposed between each collar and each pipe, respectively. A filter ring 35 is disposed between the first collar 50 and the first pipe 30. A filter ring 35 is disposed between the second collar 52 and the second pipe 32. A plurality of spaced apart injection holes 33 is disposed within the first pipe 30 and the second pipe 32. The injection holes 33 are in communication with the air spaces 54, respectively. One Tee 42 is disposed below the first collar 50, and one Tee 42 is disposed below the second collar 52. The two Tee's 42 disposed proximal to the bottom end 22 are connected by a second T-junction 60. A plurality of spaced apart inlet holes 64 is disposed within each Tee 42 proximal to the bottom end 22, the inlet holes 64 configured for waste water inlet. An air line 70 is disposed between the first pipe 30 and the second pipe 32 and extended above the top end 20. The air line 70 is configured for attachment to an existing air pump. An air Tee 72 is connected to the air line 70. The air Tee 72 is disposed between and connected to the air spaces 54 in the first collar 50 and the second collar 52.

What is claimed is:
1. A septic aerator comprising:
   a top end spaced apart from a bottom end;
   a first pipe spaced apart from a parallel second pipe;
   a plurality of Tee's, one Tee affixed atop the first pipe and one Tee affixed atop the second pipe;
   a first T-junction joining the two Tee's atop the first pipe and second pipe, respectively;
   a pair of elbows, one elbow affixed atop the Tee atop the first pipe and one elbow affixed atop the Tee atop the second pipe, the elbows faced in 180 degree offset;
   a first collar affixed on the first pipe proximal to the bottom end;
   a second collar affixed on the second pipe proximal to the bottom end;
   a filter ring disposed between the first collar and the first pipe;
   a filter ring disposed between the second collar and the second pipe;
   an air space disposed between the first collar and the first pipe;
   an air space disposed between the second collar and the second pipe;
   a plurality of injection holes disposed within the first pipe and the second pipe, the injection holes in communication with the air spaces;
   one of the Tee's disposed below each of the first collar and the second collar, respectively;

a second Tee junction connecting the Tee's affixed below the first collar and the second collar;

a plurality of inlet holes disposed in each Tee below each collar, the inlet holes proximal to the bottom end;

an air line disposed between the pipes and extended above the top end;

wherein the air line is configured for attachment to an existing air pump; and an air Tee connected to the air line, the air Tee in communication with the first collar and the second collar airspaces;

wherein the bottom end is configured to rest on a bottom of a septic tank; and wherein the elbows are configured to extend partially above a wastewater level with the septic tank.

2. A septic aerator comprising:

a top end spaced apart from a bottom end;

a first pipe spaced apart from a parallel second pipe, the pipes identical;

a plurality of identical Tee's, one Tee affixed atop the first pipe and one Tee affixed atop the second pipe;

a first T-junction joining the two Tee's atop the first pipe and second pipe, respectively;

a pair of identical elbows, one elbow affixed atop the Tee atop the first pipe and one elbow affixed atop the Tee atop the second pipe, the elbows faced in 180 degree offset;

a first collar affixed on the first pipe proximal to the bottom end;

a second collar affixed on the second pipe proximal to the bottom end;

a filter ring disposed between the first collar and the first pipe;

a filter ring disposed between the second collar and the second pipe;

an air space disposed between each collar and each pipe, respectively;

a plurality of injection holes disposed within the first pipe and the second pipe, the injection holes in communication with the air spaces;

one of the Tee's disposed below each of the first collar and the second collar, respectively;

a second Tee junction connecting the Tee's affixed below the first collar and the second collar;

a plurality of inlet holes disposed in each Tee below each collar, the inlet holes proximal to the bottom end;

an air line disposed between the pipes and extended above the top end;

wherein the air line is configured for attachment to an existing air pump; and an air Tee connected to the air line, the air Tee in communication with the first collar and the second collar airspaces;

wherein the bottom end is configured to rest on a bottom of a septic tank; and wherein the elbows are configured to extend partially above a wastewater level with the septic tank.

* * * * *